(12) United States Patent
Wiest et al.

(10) Patent No.: US 11,084,750 B2
(45) Date of Patent: Aug. 10, 2021

(54) METHODS AND APPARATUS FOR MANUFACTURING AND PRINTING HOLLOW SPHERES

(71) Applicant: United States of America as represented by the Secretary of the Navy, Norco, CA (US)

(72) Inventors: Aaron Wiest, Norco, CA (US); Rebecca Stevens, Anaheim, CA (US); Robert Dale Conner, Oak Hills, CA (US); Craig MacDougall, Norco, CA (US); Sam Pratt, Arlington, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 32 days.

(21) Appl. No.: 16/040,374

(22) Filed: Jul. 19, 2018

(65) Prior Publication Data
US 2020/0023570 A1    Jan. 23, 2020

(51) Int. Cl.
| | |
|---|---|
| *C03B 19/10* | (2006.01) |
| *B33Y 30/00* | (2015.01) |
| *B29D 22/04* | (2006.01) |
| *B29C 64/194* | (2017.01) |
| *B29C 64/393* | (2017.01) |
| *B29C 64/106* | (2017.01) |
| *B33Y 10/00* | (2015.01) |

(52) U.S. Cl.
CPC ........ *C03B 19/1075* (2013.01); *B29C 64/106* (2017.08); *B29C 64/194* (2017.08); *B29C 64/393* (2017.08); *B29D 22/04* (2013.01); *B29C 2945/7605* (2013.01); *B33Y 10/00* (2014.12); *B33Y 30/00* (2014.12)

(58) Field of Classification Search
CPC .......................... C03B 19/107; C03B 19/1075
See application file for complete search history.

(56) References Cited

U.S. PATENT DOCUMENTS

| | | | | |
|---|---|---|---|---|
| 4,023,953 A | * | 5/1977 | Megles, Jr. ........... | C03B 17/025 65/86 |
| 4,548,196 A | * | 10/1985 | Torobin .............. | B29C 49/0042 126/654 |
| 4,777,154 A | * | 10/1988 | Torobin .................. | B29C 70/66 501/84 |
| 4,867,931 A | * | 9/1989 | Cochran, Jr. ............ | B01J 13/04 264/9 |
| 2017/0057857 A1 | * | 3/2017 | Wiest ..................... | B22D 23/06 |
| 2019/0161379 A1 | * | 5/2019 | Fisher, Jr. ............... | C03B 17/04 |

OTHER PUBLICATIONS

"Industrial Glass", Britannica Online Encyclopedia, retrieved Sept. 9, 2014, 26 pages. (Year: 2014).*

* cited by examiner

*Primary Examiner* — Lisa L Herring
(74) *Attorney, Agent, or Firm* — Naval Surface Warfare Center, Crane Division; Christopher A. Monsey

(57) ABSTRACT

Apparatus and methods for forming and printing hollow bodies from amorphous materials to form three-dimensional objects are provided. Apparatus provide a hollow body forming and printing machine, and methods for determining a desired amount of impact deformation for the hollow spheres, including calculating specific characteristics of the hollow spheres and the amorphous material, deriving a target viscosity range, adjusting the apparatus to satisfy the target viscosity range, and using the apparatus to form a plurality of hollow spheres with controlled deformation.

20 Claims, 12 Drawing Sheets

METHODS AND APPARATUS FOR MANUFACTURING AND PRINTING HOLLOW SPHERES

STATEMENT OF FEDERAL FUNDING

The invention described herein was made in the performance of official duties by employees of the Department of the Navy and may be manufactured, used and licensed by or for the United States Government for any governmental purpose without payment of any royalties thereon. This invention (Navy Case 200,545) is assigned to the United States Government and is available for licensing for commercial purposes. Licensing and technical inquiries may be directed to the Technology Transfer Office, Naval Surface Warfare Center Corona. Licensing and technical inquiries may be directed to the Technology Transfer Office, Naval Surface Warfare Center Corona Division, email: CRNA_CTO@navy.mil.

FIELD OF THE INVENTION

The present disclosure relates to methods and apparatus for manufacturing hollow spheres, and more particularly to methods and apparatus for 3D printing hollow spheres from amorphous materials.

BACKGROUND OF THE INVENTION

Hollow spheres can be useful across a wide variety of industries. In many conventional techniques, hollow spheres are made by coating sacrificial spheres with crystalline metals and thermally or chemically removing the sacrificial material. Another method of hollow sphere production involves incorporating blowing agent into bulk material, powdering the material and heating the ground material (frit) to a temperature high enough to soften the frit and activate the blowing agent. Atomizing metallic melts is yet another method. However, existing systems of forming hollow spheres suffer from various disadvantages and are not easily adjustable or scalable. Additionally, although amorphous materials may offer several advantages due to their unique properties, there are various manufacturing and design difficulties that may be encountered. Thus, there exists a need for improved manufacturing techniques that offer better control over the final product and its characteristics while successfully forming hollow spheres from amorphous materials, and allowing for the use of such hollow spheres.

SUMMARY OF THE INVENTION

The present disclosure provides, in accordance with the current inventive method, embodiments of methods and apparatus for 3D printing hollow spheres from amorphous materials.

Many embodiments are directed to apparatus for forming hollow spheres from an amorphous material including:
- a heatable amorphous material reservoir having upper and lower ends and defining a heatable inner volume, and wherein the lower end has a amorphous material outlet formed therein;
- at least one gas conduit in fluid communication with a gas supply and having a gas outlet disposed at one end thereof, the gas outlet being disposed substantially coaxially within the amorphous material outlet;
- at least one amorphous material conduit defined by a gap between an inner wall of the amorphous material outlet and an outer wall of the gas outlet, and being in fluid communication with the inner volume of the heatable amorphous material reservoir;
- wherein at least a portion of the at least one gas conduit is vertically movable within the apparatus and configured such that a vertical movement of the gas conduit alters the volume of a flow of the fluid amorphous material through the at least one amorphous material conduit from a closed state wherein a portion of the gas conduit seals against a portion of the amorphous material conduit to prevent the fluid amorphous material from flowing through the amorphous material outlet, to an open configuration wherein the fluid amorphous material disposed within the heatable amorphous material reservoir flows through the at least one amorphous material conduit to the amorphous material outlet; and
- wherein the gas and liquid outlet are configured such that gas flowing through the outlet is entrained within the flow of the fluid amorphous material as one or more hollow spheres at the liquid outlet.

In other embodiments, the vertical movement of the gas conduit causes a concomitant movement in the vertical position of the gas outlet relative to the amorphous material outlet, such that the width of the gap forming the amorphous material conduit, and thereby the volume of a flow of the fluid amorphous material is adjustable from a closed state wherein the outer wall of the gas outlet presses against the inner wall of the amorphous material outlet, to an open configuration such that a fluid amorphous material disposed within the heatable amorphous material reservoir flows through the at least one amorphous material conduit to the amorphous material outlet.

In still other embodiments, the change in the amorphous material conduit from the open to the close state is configured to occur sufficiently rapidly to allow for the formation of a single hollow sphere.

In yet other embodiments, the width of the gap in the open state is variable such that the thickness of the walls of the one or more hollow spheres is variable.

In still yet other embodiments, the diameter of the liquid outlet is variable such that the diameter of the one or more hollow spheres is variable.

In still yet other embodiments, the apparatus further includes a separate gas nozzle defining the gas outlet and being adjustably disposed within the end of the gas conduit.

In still yet other embodiments, the relative vertical position of the gas outlet within the liquid outlet is adjustable by rotating the gas conduit within the apparatus.

In still yet other embodiments, an amorphous material disposed within the inner volume is selected from the group consisting of glass compositions, silicate glasses, metallic glasses, ceramic glasses, and composite materials with an amorphous phase and amorphous or crystalline inclusions.

In still yet other embodiments, the liquid outlet is annular.

In still yet other embodiments further includes a base plate disposed in line with the liquid and gas outlets. In some such embodiments the distance between the base plate and the liquid and gas outlets is such that the hollow sphere formed at the liquid outlet reaches terminal velocity while falling. In other such embodiments, one or both the lower end of the heatable liquid material reservoir and the base plate are moveable relative to each other in at least three dimensions. In other such embodiments, further includes a cooling element disposed between the liquid outlet and the base plate. In other such embodiments, the viscosity of the hollow sphere at the base plate is from 2 Pa-s to $10^8$ Pa-s. In other such embodiments, the outlet and the base plate are moveable relative to each other at a velocity greater than or equal to the product of the diameter of the hollow sphere and a hollow sphere production rate for the apparatus at that diameter. In other such embodiments, multiple of the apparatus are disposed above the base plate. In other such embodiments, the apparatus further includes at least one conventional additive manufacturing apparatus disposed above the base plate. In some such embodiments, the at least one conventional additive manufacturing apparatus is configured to deposit a support material.

In still yet other embodiments, the apparatus further includes a crucible disposed in heating relation with the heatable liquid reservoir.

In still yet other embodiments, the hollow spheres have a radius of from 10 um to 10 mm.

In still yet other embodiments, the hollow spheres have a wall thickness from a fourth to a hundredth of the radius of the hollow sphere.

Many other embodiments are directed to methods of forming hollow spheres from an amorphous material including:
  providing an amorphous material having a temperature-dependent viscosity;
  providing a source of a gas;
  flowing a stream of the gas coaxially through a flow of the amorphous material to form at least one hollow sphere having the gas disposed therein;
  depositing the at least one hollow sphere onto a base plate surface such that the at least one hollow sphere free falls for a sufficient time to generate a target kinetic energy in the at least one hollow sphere, wherein the kinetic energy on impact with the surface is sufficient to deform the at least one hollow sphere without rupture; and
  repeating the deposition of a plurality of hollow spheres layer-by-layer to form a three dimensional object therefrom.

In other embodiments, the method further includes heating the amorphous material to a target temperature such that the amorphous material has a target viscosity, and allowing the hollow sphere to fall for a time sufficient to cool the amorphous material to an impact viscosity such that the kinetic energy is sufficient to deform the at least one hollow sphere without rupture.

In still other embodiments, the method further includes actively cooling the fall region through which the at least one hollow sphere drops.

In yet other embodiments, the amorphous material is selected from the group consisting of glass compositions, silicate glasses, metallic glasses, ceramic glasses, and composite materials with an amorphous phase and amorphous or crystalline inclusions.

In still yet other embodiments, the hollow spheres have a radius of form 10 μm to 10 mm.

In still yet other embodiments, the hollow spheres have a wall thickness of from a fourth to a hundredth of the radius of the hollow sphere.

In still yet other embodiments, the target viscosity is from 0.002 Pa-s to 8145 Pa-s.

In still yet other embodiments, the method further includes dropping the hollow spheres such that the hollow spheres reach terminal velocity.

In still yet other embodiments, the nozzle or base plate can move relative to each other in at least three dimensions.

In still yet other embodiments, the method further includes moving one or both the nozzle or the base plate at a velocity greater than or equal to the product of the diameter of the hollow sphere and a hollow sphere production rate of the apparatus for that diameter.

In still yet other embodiments, the method further includes modifying the volume of the flow of the amorphous material such that hollow spheres having at least two different wall thicknesses are formed.

In still yet other embodiments, the target viscosity is from 2 Pa-s to $10^8$ Pa-s.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present apparatus and methods will be better understood by reference to the following detailed description when considered in conjunction with the accompanying data and figures, which are presented as exemplary embodiments of the disclosure and should not be construed as a complete recitation of the scope of the inventive method, wherein.

DETAILED DESCRIPTION OF THE INVENTION

The embodiments of the inventive methods and apparatus described herein are not intended to be exhaustive or to limit the inventive methods and apparatus to precise forms disclosed. Rather, the embodiments selected for description have been chosen to enable one skilled in the art to practice the invention.

Turning now to the drawings, methods and apparatus for forming hollow spheres from an amorphous material and using such hollow spheres as a feedstock material in additive manufacturing processes are provided. In accordance with many embodiments, the method involves providing an apparatus for forming hollow spheres, determining a desired amount of impact deformation for the hollow spheres, calculating specific characteristics of the hollow spheres and amorphous material, deriving a target viscosity range, adjusting the apparatus to satisfy the target viscosity range, and using the apparatus to form a plurality of hollow spheres with controlled deformation upon impact. Embodiments are also provided that allow for the use of such hollow spheres in additive manufacturing processes. Embodiments of hollow sphere forming and printing apparatus may take a number of forms, and may include outlets for emitting hollow spheres capable of configuration to allow for the emission of droplets of specific size and the formation of hollow spheres of specific sphericity. For the purposes of this specification, hollow sphere shall mean hollow bodies that are not necessarily perfectly spherical, and shall include ellipsoids and other hollow geometries.

Embodiments of Hollow Sphere Forming Apparatus

Figure 1A:
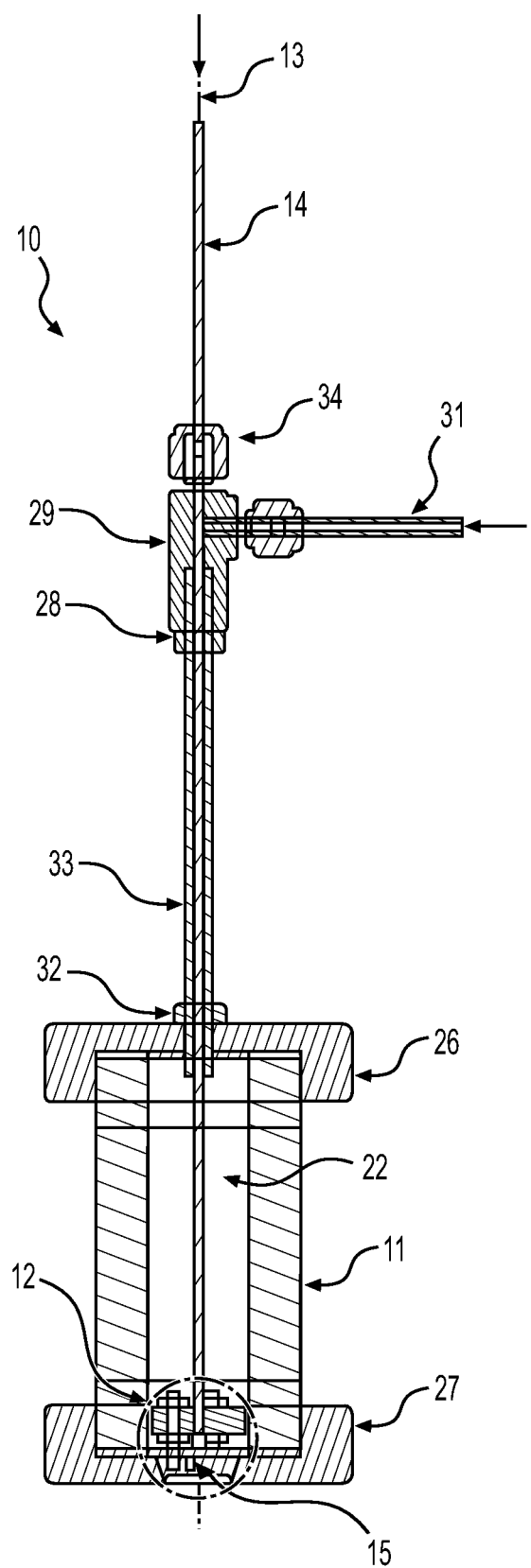
FIG. 1A provides a schematic diagram of an apparatus for forming hollow spheres in accordance with exemplary embodiments of the invention.
Figure 1B:
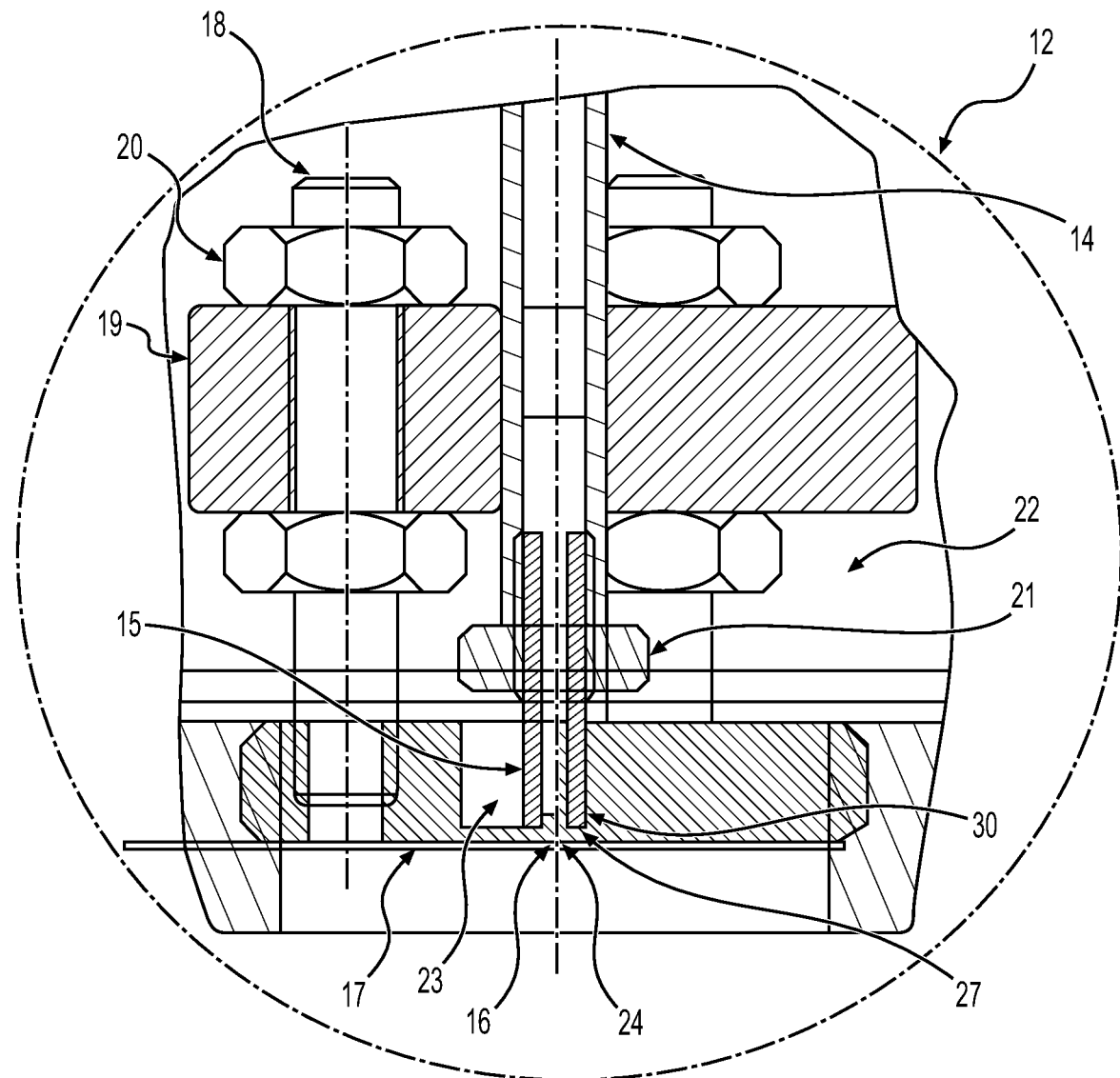
FIG. 1B provides a detailed view of an amorphous material outlet, gas outlet, and opening of the apparatus of FIG. 1A according to exemplary embodiments of the invention.

Many embodiments are directed to an apparatus for forming hollow spheres such that one or more of the properties (e.g., wall thickness, diameter, fill gas, temperature, production rate, sphere shape, etc.) of the hollow spheres are controllable. FIGS. 1A and 1B provide schematics of exemplary embodiments on such an apparatus. As shown in FIGS. 1A & 1B, the hollow sphere forming apparatus (10) generally comprises: a heatable amorphous material reservoir (11) and at least one hollow sphere outlet (12) in fluid communication with the heatable amorphous material reservoir and at least one gas conduit (14) that is itself in fluid communication with a gas supply (as shown by arrow (13)), where the gas conduit (14) is secured within the apparatus (10) such that at least one gas outlet (24) of the gas conduit (14) is disposed within the amorphous material outlet (16).

As shown in greater detail in FIG. 1B, the hollow sphere outlet region (12) generally comprises the gas outlet (24) formed into a lower portion of the gas conduit (15) and an amorphous material outlet (16) formed between an inner wall of a lower outlet nozzle plate (17) and an outer wall of the lower portion of the gas conduit (15). In many embodiments, the amorphous material outlet (16) and the gas outlet (24) are disposed substantially coaxially, and the hollow sphere outlet (12) is configured to form hollow spheres by injecting a gas of choice from the gas outlet (24) into a flow of amorphous material emitted from the amorphous material outlet (16), such that hollow spheres having defined wall thickness and defined radius are formed.

It will be understood that the dimensions and characteristics of the hollow spheres will depend on the exact relationship between the flows of amorphous material and gas, and the nature of their combination. In many embodiments, configurations of the apparatus (10) allow for the relative adjustment of these flows. For example, as shown in FIG. 1B, in many embodiments the relative position of the outer wall of the lower portion of the gas conduit (15) to the inner wall of the lower outlet nozzle plate (17) may be adjustable. In one such embodiment the relative position is adjusted through actuation of one or more spacer elements (18) adjustably interconnected between the lower outlet nozzle plate and an upper outlet nozzle plate (19) through and into which gas conduit (14) may be disposed. Although spacer elements comprises of threaded bolts (18) with cooperative adjustable nuts (20) are shown in the embodiments provided in FIG. 1B, it will be understood that any element suitable for adjusting the position of the upper nozzle plate to the lower nozzle plate may be used in accordance with embodiments. For further adjustability, in various embodiments the gas outlet (24) may itself be disposed in a separate lower gas conduit element (15) disposed within the lower end of the gas conduit (14) and interconnected therewith via a suitable attachment element (21), such as, for example, a threaded securing nut as shown in the exemplary embodiment provided in FIG. 1B. In many embodiments the upper body of the lower gas conduit element (15) may be configured to engage with the attachment element (21), as shown in FIG. 1B to secure the outlets within the gas conduit.

Figure 1C:
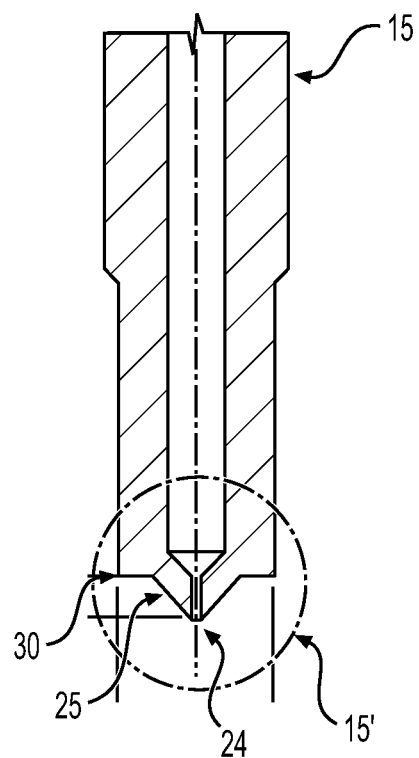
FIG. 1C provides a detailed view of a gas outlet in accordance with exemplary embodiments of the invention.

In various other embodiments, as shown in FIG. 1C, the terminating end (15') of the lower gas conduit (15) is configured to comprise both a gas nozzle (24) and the outer wall (25) is configured to form a portion of the amorphous material conduit. Specifically, the gas nozzle (24) is configured with a radius designed to provide a specific gas flow velocity and volume. Likewise, the outer wall (25) of the gas outlet is configured to cooperatively align with the lower nozzle plate (17) to define the amorphous material conduit (not shown) and outlet (16) such that the liquid flows and the gas flows converge in proximity to each other such that they combine to form the hollow spheres.

In many embodiments, as shown in FIG. 1B, the lower gas conduit (15) may further include a tapered shoulder (30) configured to engage with a corresponding shoulder (27) on the bottom nozzle plate (17). In various such embodiments, the shoulders (27 & 30) are configured such that, when engaged, the tip of the lower gas conduit where the gas outlet (24) is disposed is retracted from the amorphous material outlet (16) surface in the bottom nozzle plate (17) such that the precision surfaces are prevented from contacting each other, thereby preserving the precision surfaces and ensuring flow of material from the amorphous outlet. In other embodiments, as will be described in greater detail below, the shoulders (27 & 30) may be configured such that when touching the flow of amorphous material may be restricted or prevented altogether such that the liquid and molten amorphous material does not flow from the amorphous material outlet (16).

Figure 1D:
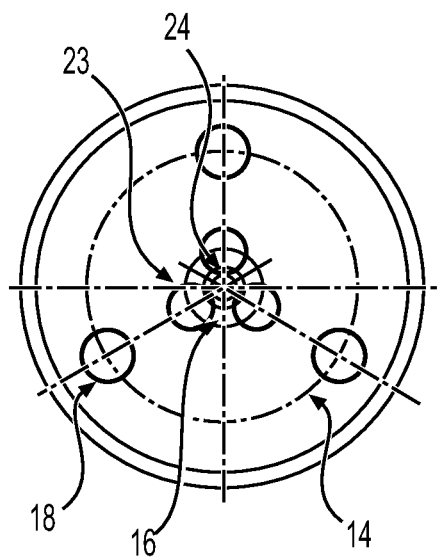
FIG. 1D provides a detailed view of the opening and gas and amorphous material outlets of an apparatus for forming hollow spheres in accordance with several exemplary embodiments of the invention.
Figure 1E:
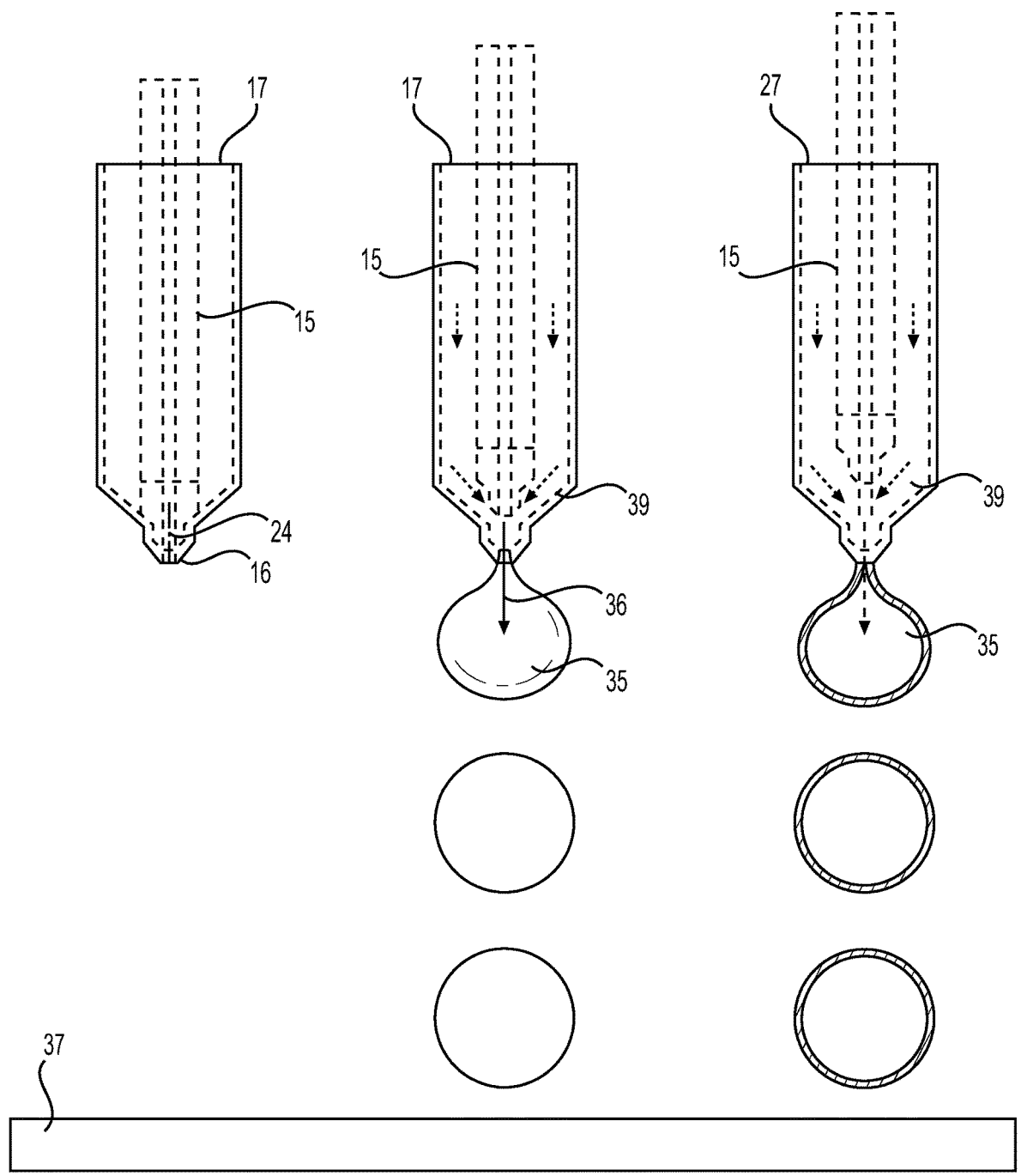
FIG. 1E provides a schematic diagram of the operation of an apparatus as described in FIGS. 1A to 1D for forming hollow spheres in accordance with embodiments of the invention.

In embodiments, the heatable amorphous material reservoir has a defined heatable inner volume (22) and is configured to contain liquid amorphous material suitable for forming hollow spheres. In many embodiments, as shown in FIGS. 1B and 1D, the amorphous material outlet (16) is in fluid communication with the heatable amorphous material reservoir through one or more amorphous material conduits (23) formed into the upper portion of the lower outlet nozzle plate (17) such that at least a portion of the amorphous material can flow from the heatable inner volume into the amorphous outlet (16). In exemplary embodiments, as shown in FIGS. 1D and 1E, the liquid amorphous material is disposed within the inner volume and flows through the amorphous material conduits (23) in the lower outlet nozzle plate to the lower amorphous material conduit (39) formed between the outer wall (25) of the lower gas conduit (15) and the inner wall of the lower nozzle plate (17) and then through the at least one amorphous outlet (16) and exits the apparatus at the coaxially aligned gas outlet (15) such that when the apparatus is in use, the amorphous material may flow through the amorphous outlet (16) around the lower gas conduit (15) and combining with gas from the gas outlet (24) thus forming the hollow spheres. As discussed above, in most embodiments, the size, shape, and physical parameters of the hollow spheres may be controlled by altering the relative flow of the gas and amorphous material.

It will be understood that in many embodiments, "substantially coaxially" will be defined to be configurations having less than about 25% difference between the largest and smallest orthogonal distance between the gas and amorphous material outlets. In most embodiments, the apparatus (10) is configured such that the gas outlet (24) and amorphous outlet (16) can be disposed coaxially therewith and therein such that a gas passing through said gas outlet (24) will be deposited within the flowing amorphous material. Likewise, although the description defines the outlets as terminating proximal to each other, in various embodiments, the gas outlet (24) may protrude slightly beyond the amorphous outlet (16), or the amorphous outlet (16) and the gas outlet (24) may be flush (on the same plane), or the gas outlet (24) may be slightly retracted. As described above, in many exemplary embodiments of the inventive method, the relative positions of the gas and amorphous outlets are adjustable in at least one dimension (e.g., axially, radially, or angularly relative to each other), such that a more uniform annular exit region (opening) for the gas and amorphous outlets may be configured in the apparatus (10), and such that a variety of hollow spheres may be formed, reducing the rejection rate in solidified hollow spheres.

FIG. 1E provides a schematic illustrating how the position of the gas outlet (15) may be altered relative to the lower nozzle plate (17) (shown in FIG. 1B) for use with various embodiments of the invention, and how they may be altered to adjust the flow of amorphous material and thereby allow for the rapid inception or cessation of the production of hollow spheres and/or the continuous variance of the thickness of the hollow sphere walls. For example, as shown in FIG. 1E (left) where the shoulder (30) and/or tip (25) of the lower gas conduit (15) is disposed against the amorphous outlet (16) of lower nozzle plate (17) molten amorphous material is prevented from flowing through the amorphous outlet, thus shutting off the hollow sphere formation flow. By contrast, as shown in FIG. 1E (center) where the gas outlet is withdrawn away from the amorphous outlet the amorphous material is allowed to flow through the annular amorphous outlet opening, thus allowing for the formation of hollow spheres. Moreover, the amount of amorphous material may be regulated in this fashion, as shown in FIG. 1E (right), such that thicker walled hollow spheres may be thus formed. Moreover, the wall thickness may be varied in real time to allow for the deposition of a variety of hollow spheres having a variety of different physical properties depending on the object to be formed.

Although many mechanisms may be provided to allow for the relative movement of the gas and amorphous outlets, in the embodiments provided in FIG. 1A, a lockable rotating assembly is provided such that the position may be controlled. For example, in exemplary such embodiments, the locking nuts (28) and (32) between the top crucible plate (26) and the gas junction (29) allow an outer externally threaded tube (33) to be locked in place. The gas conduit (14) is disposed within this outer tube and runs through the amorphous material reservoir (11) such that the lower gas conduit (15) engages the amorphous material outlet (16). This inner gas conduit is locked in place by a lockable fitting (34), such as, for example, a lockable compression fitting. In such an embodiment, the inner gas conduit (14) may be moved into and out of position relative to the amorphous outlet (16). In one embodiment, of such a configuration when the inner tube is rotated clockwise with the lower nut (32) loosened but the upper locking nut (28) tightened, the inner gas tube may be raised or lowered. If rotated while bubbles are being formed, the hollow sphere wall thickness can be changed real time during 3D printing, as shown in FIG. 1E.

Although single wall thickness hollow spheres are shown in the figures, it should be understood that functionally graded materials may also be fabricated. For example, in a buoyancy application where the outer bubbles of an object are desired to be stronger and thicker and the inner bubbles are lower weight and strength, or in an impact mitigating material with weak bubbles, mid strength bubbles and strong bubbles disposed throughout to change the impact dynamics and operating range of a helmet or car bumper.

Although the above description details the portions of the apparatus comprising the gas and amorphous outlets, it will be understood that other elements of the apparatus may also be altered. For example, as shown in FIG. 1A, in various embodiments the heatable amorphous reservoir (22) may be disposed between two crucible plates (26/27) to constrain the reservoir and confine the amorphous material therein, although in other embodiments the reservoir may be of a single piece construction. Similarly, although the gas conduit (14) has been defined generally, it will be understood that it may be interconnected through suitable interconnections (29) with a variety of other elements as necessary for the specific application. For example, as shown in FIG. 1A, in various embodiment the gas conduit may be interconnected through a junction (29), such as, for example, a "T" junction, to other gas or pressure inlets or outlets (31) such that the pressure within the heatable liquid reservoir may be configured as desired. For example, by pressurizing the gas or pressure inlets or outlets (31) it is possible to pressurize the liquefied amorphous materials in the crucible (22) thereby increasing the pressure of the liquefied amorphous material flow out of the outlet (15).

In various embodiments, the apparatus (10) is configured to form hollow spheres from any suitable amorphous material, and the hollow sphere outlet may be configured such that said hollow spheres have a desired wall thickness and a defined radius. Some exemplary embodiments may be configured to form hollow spheres having a radius of greater than 10 μm, greater than 100 μm, or even greater than 1 mm. Other exemplary embodiments may be configured to form hollow spheres having wall thicknesses that are a fourth to as small as a hundredth of the radius of the hollow spheres. Regardless of the specific size and wall thickness of the hollow spheres formed by the apparatus, in embodiments, the outlets (16/24) are disposed such that the hollow spheres (35) drop from the opening, as shown by the arrows (36) in FIG. 1E, until a time of impact, where the hollow spheres impact against a base plate (37) after a specified fall time.

This fall time may be adjusted by moving the distance between the nozzle and the base plate according to some embodiments of the inventive method. In some other embodiments, an annular lip may be disposed around the circumference of the amorphous material outlet (16) to assist in the formation of a meniscus from the liquid amorphous material which is then used to form hollow spheres by injecting the gas therein. Other exemplary embodiments of the invention use an apparatus without an annular opening.

Figure 2A:
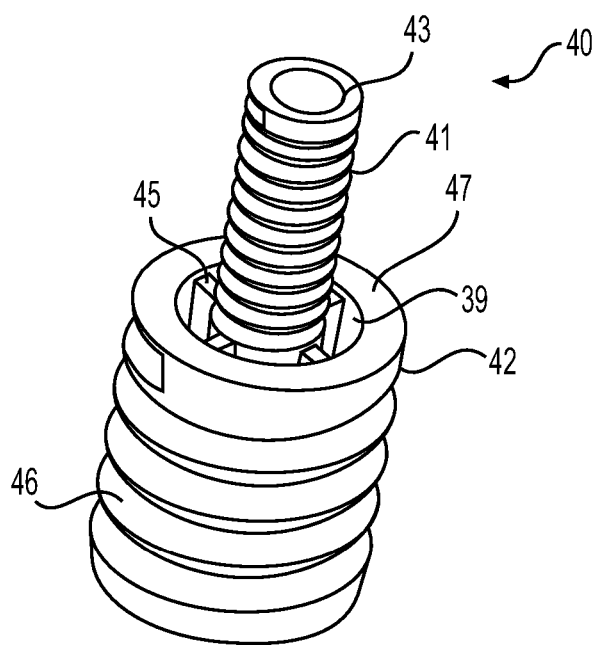
FIGS. 2A to 2C provide detailed views of a nozzle assembly of an apparatus for forming hollow spheres in accordance with exemplary embodiments of the invention.
Figure 2B:
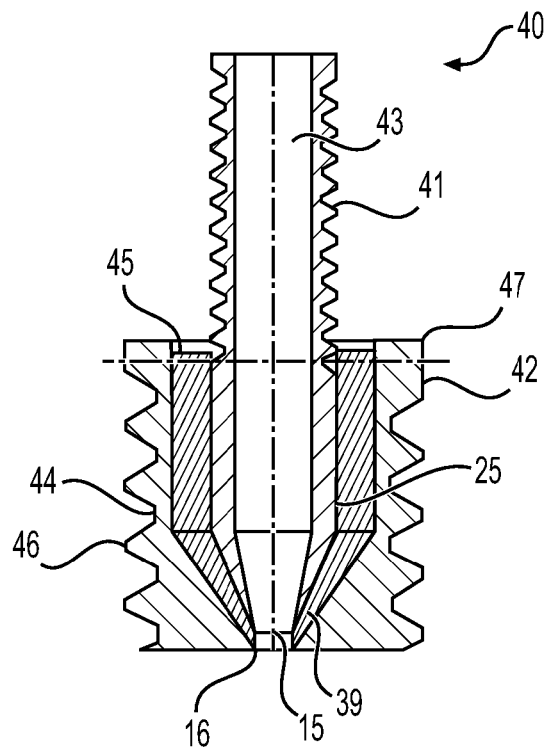
Figure 2C:
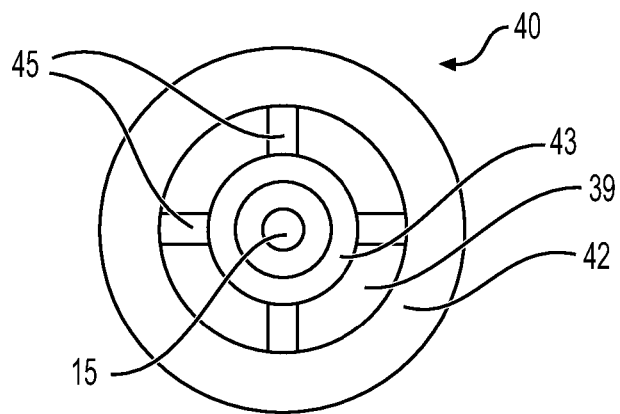

Although exemplary embodiments of hollow sphere outlets, including gas and amorphous material outlets, are shown and described with reference to FIGS. 1A to 1E, other outlet designs may be used in accordance with embodiments. One exemplary nozzle assembly incorporating threaded interconnections is illustrated schematically in FIGS. 2A to 2C. As shown in FIG. 2A to 2C in one embodiment the nozzle assembly (40) comprises a lower gas conduit (43) having a threaded outer wall (41) that is configured to cooperatively and rotatively engage with an internal thread on the gas conduit (14 from FIG. 1A). The nozzle assembly also incorporates an amorphous material outlet body (42) integrated with the lower gas conduit (43) through a plurality of spacing struts (45) such that the outer surface (25) of the lower gas conduit (43) is fixed relative to the inner surface (44) of the amorphous material outlet body such that the amorphous material conduit (39) is fixed, although in many embodiments the gas conduit may be configured to move relative to the amorphous material outlet body such that the width of the amorphous material conduit (39) may be varied during formation of the hollow spheres. The plurality of spacing struts (45) may also be configured to maintain the coaxial arrangement of the lower gas conduit (43) within the amorphous material outlet body (42), as shown in FIG. 2C. Although four struts are shown in the schematic, it will be understood that any number and spacing of struts may be provided such that the coaxial arrangement and spacing of the gas and amorphous material outlet bodies can be securely maintained. Further, it will be understood that in many embodiments the amorphous outlet body (42) may itself have an outer threading (46) such that the amorphous material outlet body may be securely disposed within the lower nozzle plate (17) provided with a cooperative threading.

During operation the gas conduit (14) may be rotated relative to the nozzle (40) along the threads (41) of lower gas conduit (43) such that the end of the gas conduit abuts against the shoulder (47) of the amorphous material outlet body (42) thus cutting off the flow of amorphous material to the amorphous material conduit (39) and the formation of hollow spheres from the amorphous material outlet (16).

In yet other embodiments, the apparatus (10) may further comprise a crucible, a pressure vessel, a cooling vessel, at least one nozzle assembly plate, or a cooling tube. In some exemplary embodiments, the inventive method further comprises cooling at least one component of the apparatus (10) to cool the hollow spheres. A crucible may be used in some embodiments if heating of material is required or if a solid material is to be melted or taken above a glass transition temperature. In some other embodiments, a pressure vessel may be made of a material with sufficient strength (e.g., material strength, material thickness, etc.) to contain the pressure required to extrude the liquid amorphous material through the amorphous material outlet (16) of the apparatus (10). In still other embodiments, a cooling tube will be of sufficient height to allow the hollow spheres to cool and solidify therein during transit therethrough, allowing the spheres to solidify in a controlled environment. In yet other embodiments multiple amorphous material outlets (16) and gas outlets (24) may be machined into a nozzle assembly, or array, to increase hollow sphere forming capacity of the apparatus (10). In some such embodiments, the nozzle assembly or array will be more efficient for a uniform array of precisely positioned hollow spheres. In several embodiments, the hollow spheres may be quenched and/or processed in a controlled environment (e.g., temperature, pressure, atmosphere, etc.) as required for a particular application.

Embodiments of Methods of Forming and Printing Semispherical Hollow Bodies

Figure 3:
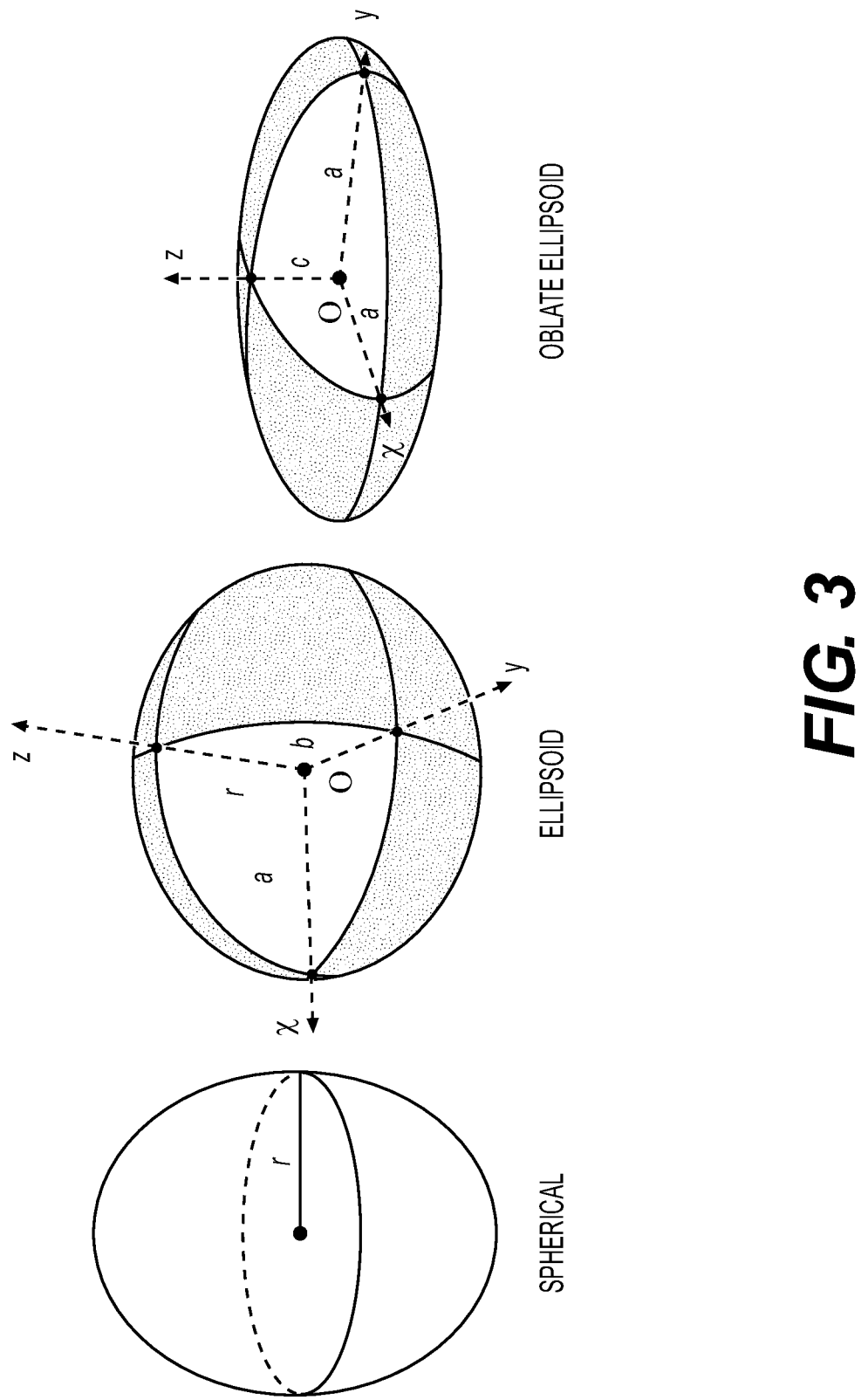
FIG. 3 provides schematics of spherical, ellipsoid and oblate ellipsoid spherical bodies in accordance with embodiments.

Although the above discussion has focused on embodiments of a hollow sphere forming apparatus, this disclosure also provides embodiments directed to methods of forming spherical and semispherical hollow bodies and printing such hollow bodies on substrates. As discussed above, embodiments provide an apparatus capable of forming free-falling hollow spheres and directing those spheres onto a base plate. According to embodiments of the method, the final shape of the deposited hollow sphere is determined by the temperature of the hollow sphere on impact, or more specifically, the viscosity of the material forming the hollow sphere as a function of temperature. If the hollow sphere has a very high viscosity at impact it will tend to bounce elastically off the base plate like a ping pong ball. On the other hand, if the sphere has a very low viscosity on impact the hollow sphere will tend to rupture like a droplet of water. However, it has been discovered that between these extremes, the hollow sphere will deform on impact. The actual deformed shape may be a complex geometry but is approximated as an ellipsoid somewhere between a sphere and an oblate ellipsoid, as shown in FIG. 3 for simplifying the theoretical analysis and calculations. Embodiments of the invention provide methods for controlling the precise deformation of the hollow bodies at deposition thus allowing for the formation of engineered structures formed from a plurality of printed hollow bodies of amorphous material.

To approximate the conditions required to obtain specific hollow body conformations embodiments of the method incorporate models of how impacting amorphous hollow bodies of various viscosities deform. In some such embodiments, each amorphous hollow sphere is modelled using shear mechanics. In such a model a hollow sphere (such as that shown to in FIG. 3, left) is sheared perpendicular to the x-y plane, such that it is skewed into an ellipsoid with major axis=a, minor axis=b, and remaining axis c=r (same as the original sphere, as shown in FIG. 3, center). This can be approximated in 2D by plotting a circle of unit radius: $x^2+y^2=1$. If a uniform shear strain $\varepsilon$ is applied to the circle, it is possible to define a new x coordinate:

$$X_{new}=\varepsilon^*y+x \quad (EQ. 1)$$

When done in 2D, this will skew a circle into an ellipse. If done in 3D, it would skew a sphere into an ellipsoid with major axis=a, and minor axis=b of the ellipse, which can be found by:

$$a=\text{maximum of } \sqrt{X_{new}^2+y^2} \quad (EQ. 2)$$

and $$b=\text{minimum of } \sqrt{X_{new}^2+y^2} \quad (EQ. 3)$$

The 3D ellipsoid's third axis=c', and is found by requiring that $4\pi abc'=4\pi r^3$. By doing so, it is found that c'=r. The once sheared ellipsoid is mathematically rotated to align the a, b, and c' axes of the ellipse with x, y, and z coordinates. The ellipsoid is sheared again to deform the c' axis (equal to r after the first shear) to c. This shear is perpendicular to the x-y plane and skews the ellipsoid into an oblate ellipsoid (as shown in FIG. 3, right). This is approximated in 2D by using an ellipse with the equation:

$$x_1^2 + \frac{1}{b^2}y_1^2 = 1 \qquad (EQ. 4)$$

Define the second shear as a uniform shear strain $\varepsilon_1$ to the ellipse by defining a new x coordinate:

$$X_{1new} = \varepsilon_1 * y_1 + x_1. \qquad (EQ. 5)$$

Using these transformations it is then possible to select a shear strain $\varepsilon_1$ such that if the major axis of the ellipse=a, and if the minor axis of the ellipse=c, then the total shear strain to deform the sphere to an oblate ellipsoid is $\varepsilon + \varepsilon_1$. This method ensures the volume of the sphere is the same as the oblate ellipsoid where: $\tfrac{4}{3}\pi r^3$ is the volume of a sphere, $\tfrac{4}{3}\pi abc$ is the volume of an ellipsoid; and $\tfrac{4}{3}\pi a^2 c$ is the volume of an oblate ellipsoid. Note: This mathematical treatment of a sphere deforming to an oblate ellipsoid through shears and rotation does not capture the actual physics or mechanics of the hollow sphere's deformation. It is a useful approximation only because the equations for viscosity used later on are formulated in terms of shear deformations of a liquid. The error introduced in this non-physical approximation is assumed acceptable because the target viscosity range spans many orders of magnitude.

Using the above model in accordance with embodiments it is possible to determine the total shear strain required on impact to deform the falling hollow sphere to prevent bounce and/or rupture, and to form a desired ellipsoid shape. For example, for a unit radius hollow sphere, one can consider the case where $c_i=0.3r$, $c_j=0.6r$, and $c_k=0.9r$. Requiring that the hollow sphere and oblate ellipsoid volumes be equal leads to $a_i=1.826r$ with $\varepsilon_i=3.94$, $a_j=1.291r$ with $\varepsilon_j=1.37$, and $a_k=1.054r$ with $\varepsilon_k=0.246$.

Once the strain required to obtain a specific final hollow body shape is determined, the specific viscosity of the material of the hollow body may also be determined, and from the viscosity the operating conditions of the apparatus, such as, for example, the temperature of the amorphous material and gas, and the length of fall time for the hollow body before impact.

Turning first to the question of temperature and cooling, it will be understood that many amorphous materials have high melting points, and at high temperatures, a dominant mode of energy loss is radiative cooling. Accordingly, in embodiments, radiative cooling may be assumed to be the only mode of cooling for approximation purposes. Radiative cooling can be given by:

$$P = \frac{dE}{dT} = \varepsilon_B \sigma_B A (T_{hot}^4 - T_{ambient}^4) \qquad (EQ. 6)$$

where for high temperatures, $T_{ambient}^4$ is negligible and P is radiated power, and where the radiated energy during an interval of time $\Delta t$ is given by:

$$E = \Delta t \varepsilon_B \sigma_B A T_{hot}^4 \qquad (EQ. 7)$$

In turn, temperature as a function of time can be determined using thermodynamics principles, where the enthalpy of an amorphous material melt can be approximately written as:

$$H = C_p T \qquad (EQ. 8)$$

This approximation assumes the amorphous material is hot enough to have constant heat capacity and neglects the energy difference between a crystalline mixture of the glassy components and the glassy components and the area of the enthalpy where heat capacity is not constant. However, with the main interest being in enthalpy differences, the constants neglected cancel out in the difference calculation:

$$H(t+\Delta t) - H(t) = C_p T(t+\Delta t) - C_p T(t) \qquad (EQ. 9)$$

or equivalently, $\Delta H = C_p \Delta T$. Since the assumption for embodiments of the inventive method is that all heat loss is due to energy radiated away from the hot hollow sphere. The heat lost, enthalpy, is calculated by multiplying the heat capacity of the hot hollow sphere by the temperature change. Assuming radiative cooling, it is possible to obtain:

$$mC_p \Delta T = m\Delta H = P\Delta t = E = \Delta t \varepsilon_B \sigma_B A T_{hot}^4 \qquad (EQ. 10)$$

such that solving for $\Delta T$ gives:

$$\Delta T = \frac{\Delta t \varepsilon_B \sigma_B A T_{hot}^4}{mC_p}. \qquad (EQ. 11)$$

Figure 4:
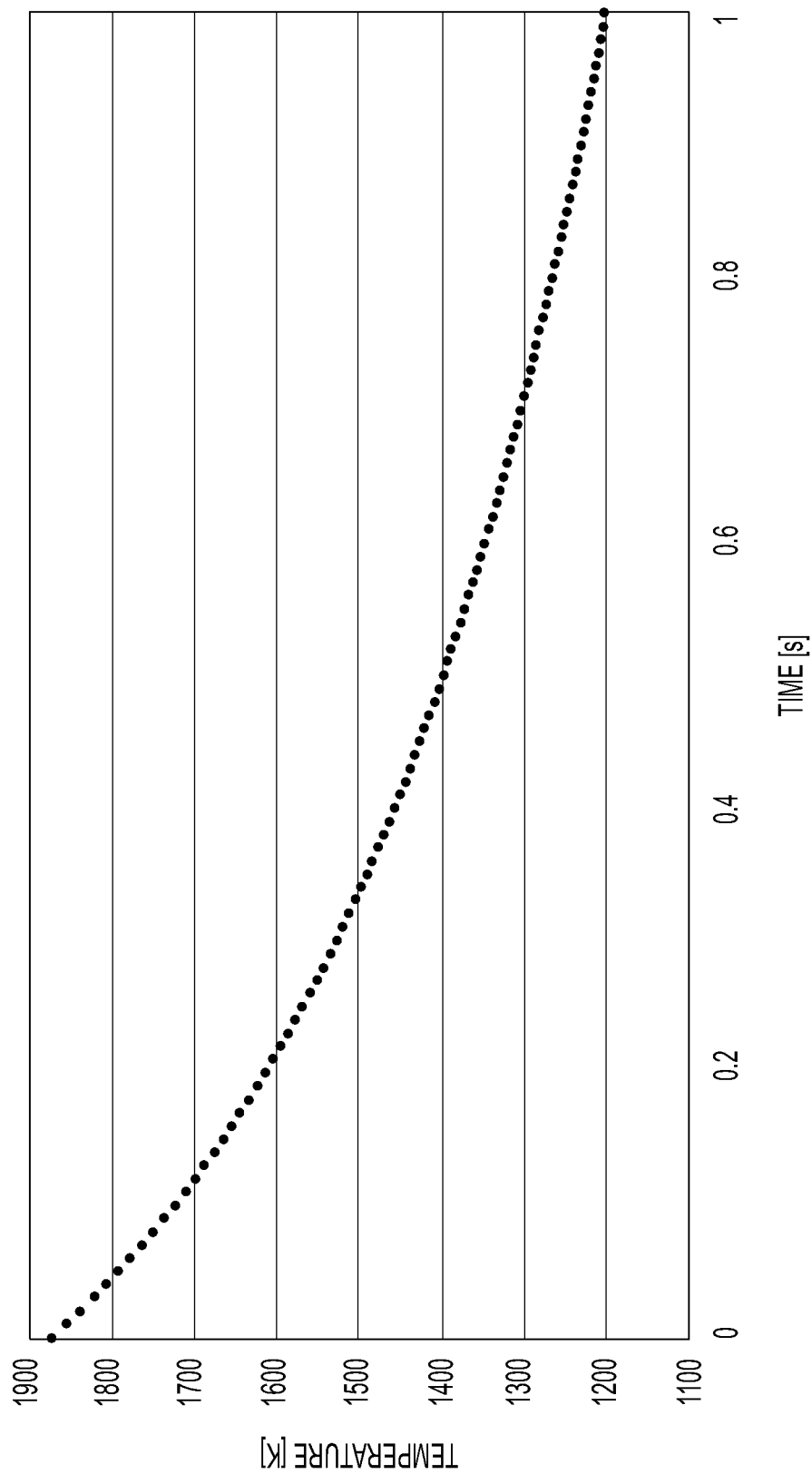
FIG. 4 provides a data plot of the radiative cooling of an E-glass hollow sphere with 1000 μm radius and 100 μm wall thickness made according to embodiments of the invention.
Figure 5:
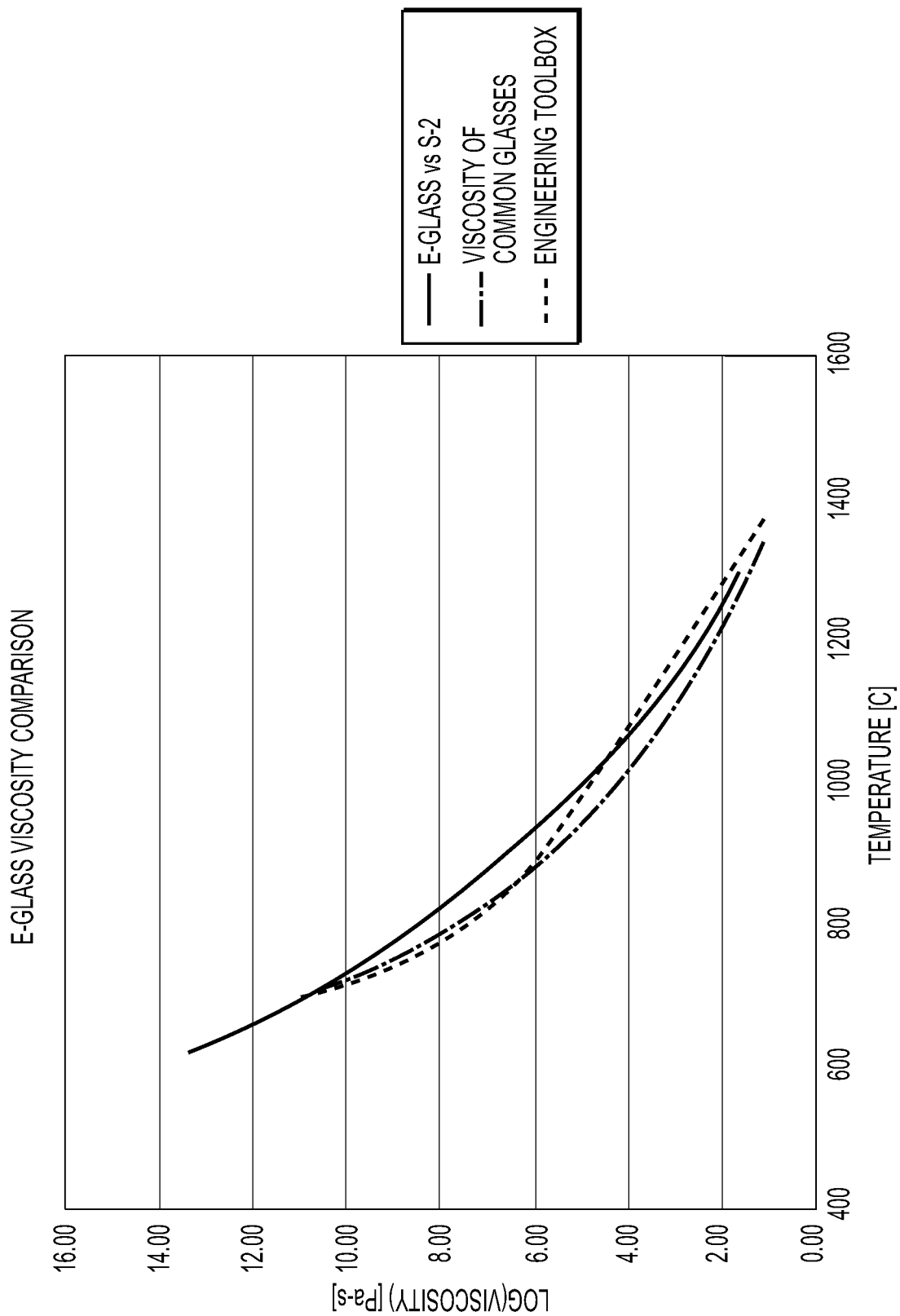
FIG. 5 provides data plots of viscosity vs. temperature for exemplary E-glasses.

FIGS. 4 and 5 illustrate how an exemplary amorphous hollow body formed from E-glass cools from 1873K to 1200K in about one second while the viscosity of E-glass increases from about 1 Pa-s to about 100000 Pa-s in the same time. FIG. 4 provides a plot of the radiative cooling of an exemplary E-glass hollow sphere having 1000 µm radius and 100 µm wall thickness that may be used with some embodiments of the inventive method. Further, FIG. 5 provides a plot of temperature-dependent viscosity for E-glass that may also be used for methods in accordance such embodiments; the plot is based on information from publicly available sources and similar plots could be obtained for other amorphous materials of interest. Using these plots and embodiments of the cooling models discussed above, it is possible to determine how long it would take for any specific amorphous material to reach a specific desired viscosity on impact.

Once the desired strain and viscosity are determined, the velocity needed on impact to create the desired hollow body deformation can also be determined. For many embodiments of the inventive method, the velocity refers to the velocity of the falling hollow sphere after being formed by the apparatus. In such embodiments, first, a mass-to-surface area ratio is used to determine the terminal velocity of an object falling under the influence of gravity. The total force on the falling bubble is the gravitational force minus the drag force:

$$(F_T = F_g - F_D) \qquad (EQ. 12)$$

Terminal velocity ($v_T$) is reached when $F_g = F_D$, $F_g = mg$ where g is simply the acceleration due to gravity (approximately $$9.8 \frac{m}{s^2});$$

thus:

$$F_D = \tfrac{1}{2} C_D \rho_{air} v^2 A \qquad \text{(EQ. 13)}$$

The drag coefficient $C_D$ for a sphere is between 0.07 and 0.5. For most embodiments, it is assumed to be 0.5 for the speeds expected for the falling sphere and the smooth surface finish provided by typical amorphous materials. When $F_g = F_D$, it is possible to obtain:

$$\tfrac{1}{2} C_D \rho_{air} v_T^2 A \qquad \text{(EQ. 14)}$$

where solving for $v_T$ gives:

$$v_T = \sqrt{\frac{2mg}{C_D \rho_{air} A}} = \sqrt{\frac{8\pi r^2 \tau \rho g}{C_D \rho_{air} A}} \qquad \text{(EQ. 15)}$$

using a thin shell volume approximation times density for the mass of the hollow sphere, given by $m = 4\pi r^2 \tau \rho$. Additionally, in most embodiments, the method also involves solving for the velocity as a function of time for cases when the hollow sphere does not reach terminal velocity prior to impacting the 3D printer's base plate. In such cases, EQ. 12 can be rewritten as:

$$ma = mg - kv^2 \qquad \text{(EQ. 16)}$$

where $k = \tfrac{1}{2} C_D \rho_{air} A$, and $$\frac{dv}{dt} = g - \frac{k}{m} v^2.$$

Rearranging to isolate $v^2$, yields:

$$\frac{m}{k} \frac{dv}{dt} = \frac{gm}{k} - v^2 \qquad \text{(EQ. 17)}$$

and rearranging again yields:

$$\frac{\frac{dv}{dt}}{v^2 - \frac{gm}{k}} = -\frac{k}{m}. \qquad \text{(EQ. 18)}$$

The last rearrangement can be put in a standard integral form:

$$\int \frac{du}{a^2 - u^2} = \frac{1}{2a} \ln \left| \frac{u+a}{u-a} \right| + c \qquad \text{(EQ. 19)}$$

where c is a constant. Setting $$a = \sqrt{\frac{gm}{k}}$$

yields:

$$\frac{dv}{v^2 - \frac{gm}{k}} = -\frac{k}{m} dt \qquad \text{(EQ. 20)}$$

Integrating both sides gives:

$$\frac{1}{2\sqrt{\frac{gm}{k}}} \ln \left| \frac{v + \sqrt{\frac{gm}{k}}}{v - \sqrt{\frac{gm}{k}}} \right| + c = \frac{k}{m} t. \qquad \text{(EQ. 21)}$$

The integration constant c is found to be zero by noting $v = 0$ at $t = 0$. Thus:

$$\sqrt{\frac{k}{4gm}} \ln \left| \frac{v + \sqrt{\frac{gm}{k}}}{v - \sqrt{\frac{gm}{k}}} \right| = \frac{k}{m} t. \qquad \text{(EQ. 22)}$$

Using the velocity model according to embodiments of the inventive method, it is possible to determine that, at the time of impact, a falling hollow body will have a velocity v and kinetic energy $= \tfrac{1}{2} mv^2$. The hollow sphere after deformation has $v = 0$ and kinetic energy $= 0$. In most embodiments it is possible to assume that all kinetic energy is used to shear the hollow sphere into the oblate ellipsoid shape. As viscosity is the ratio of stress to shear strain rate $$\left( \gamma = \frac{\sigma}{\varepsilon} \right);$$

rewriting the time derivative results in:

$$\gamma = \frac{\Delta t \sigma}{\varepsilon}. \qquad \text{(EQ. 23)}$$

As a lower bound on time, it is possible to approximate that for most embodiments that a hollow sphere with radius r deforms to an oblate ellipsoid with minor axis c, and that the center of mass of the falling hollow sphere will decelerate from v to 0 in a distance: r−c. The lower bound on time is assuming the hollow sphere maintains the velocity v during the entire deceleration such that the deformation takes place in a time:

$$\Delta t = \frac{r - c}{v}.$$

The actual deformation time will be longer. The error introduced by this approximation is found to have small impact on the range of calculated acceptable viscosities for hollow sphere impact. The kinetic energy used to deform a sphere to oblate desired ellipsoid will be equal to the product of stress, strain, and volume of material according to:

$$\tfrac{1}{2} mv^2 = \sigma \varepsilon 4\pi r^2 \tau = \frac{\gamma \varepsilon}{\Delta t} \varepsilon 4\pi r^2 \tau \qquad \text{(EQ. 24)}$$

where $4\pi r^2 \tau$ is the approximate volume of a thin-walled hollow sphere. Solving for $\gamma$ gives:

$$\gamma = \frac{mv(r-c)}{8\varepsilon^2 r^2 \pi \tau}. \quad \text{(EQ. 25)}$$

For some embodiments involving hollow spheres with radius from 10 μm to 1 mm and wall thicknesses from a tenth of the radius to a hundredth of the radius, calculated terminal velocity values (in m/s) are provided in the Table 1, below:

TABLE 1

Terminal Velocities

| Radius [μm] | Wall thickness | |
|---|---|---|
| | (1/10) r | (1/100) r |
| 10 | 1.164 | 0.116 |
| 100 | 36.8 | 3.682 |
| 1000 | 1163 | 116.4 |

The energies derived from the terminal velocities above can then be used to calculate the viscosities required to result in deformations equal to specific spheroid shapes, (e.g., c=0.3r, c=0.6r, c=0.9r) in accordance with exemplary embodiments of the invention. The results are presented in the Table 2, below:

TABLE 2

Viscosities vs. Deformation

| Radius [μm] | Thickness [μm] | C | Viscosity [Pa-s] |
|---|---|---|---|
| 10 | 1 | 0.9r | 0.081 |
| 10 | 1 | 0.6r | 0.0105 |
| 10 | 1 | 0.3r | 0.0022 |
| 10 | 0.1 | 0.9r | 0.0814 |
| 10 | 0.1 | 0.6r | 0.0105 |
| 10 | 0.1 | 0.3r | 0.0022 |
| 100 | 10 | 0.9r | 25.7 |
| 100 | 10 | 0.6r | 3.32 |
| 100 | 10 | 0.3r | 0.702 |
| 100 | 1 | 0.9r | 25.8 |
| 100 | 1 | 0.6r | 3.32 |
| 100 | 1 | 0.3r | 0.703 |
| 1000 | 100 | 0.9r | 8132 |
| 1000 | 100 | 0.6r | 1049 |
| 1000 | 100 | 0.3r | 221.9 |
| 1000 | 10 | 0.9r | 8145 |
| 1000 | 10 | 0.6r | 1050 |
| 1000 | 10 | 0.3r | 222.3 |

It should be understood that while these values are calculated for terminal velocities similar calculations can be made for hollow spheres that do not reach terminal velocity. In such embodiments, further calculation and comparison to the velocity as a function of time and the viscosity as a function of temperature and time are required. However, for most embodiments, calculations show that viscosities ranging from 0.1 Pa-s to $10^8$ Pa-s may be used, and in some embodiments from 2 Pa-s to $10^6$ Pa-s are desirable for impact depending on the hollow body geometry desired. Given the wide range of viscosities possible for use with the apparatus and methods, a similarly wide variety of amorphous materials may be used that are capable of cooling to within these useful impact viscosities. Amorphous material viscosities at various temperatures are compared to better known liquids room temperature viscosities in Table 3, below, to give one skilled in the art a sense of the flow dynamics of hollow spheres impacting an xyz stage without regard to equations.

TABLE 3

Exemplary Hollow Sphere Flow Dynamics

| Material | Viscosity (Pa-s) |
|---|---|
| Water | 0.001 |
| Olive oil | 0.1 |
| $Zr_{35}Ti_{30}Be_{27.5}Cu_{7.5}$ (789C) | 0.15 |
| $Pt_{60}Ni_{15}P_{25}$ (436C) | 0.16 |
| Karo Syrup | 2 |
| E-Glass (1400C) | 10 |
| Ketchup | 50 |
| $Zr_{46.25}Ti_{8.25}Cu_{7.5}Ni_{10}Be_{27.5}$ (637C) | 64 |
| E-Glass (1250C) | 100 |
| $Pd_{43}Ni_{10}Cu_{27}P_{20}$ (457C) | 212 |
| Peanut Butter | 250 |
| $Zr_{35}Ti_{30}Be_{27.5}Cu_{7.5}$ (431C) | 12800 |
| Window Putty | 100,000 |
| $Zr_{46.25}Ti_{8.25}Cu_{7.5}Ni_{10}Be_{27.5}$ (490C) | 132,000 |
| $Pd_{43}Ni_{10}Cu_{27}P_{20}$ (387C) | 230,000 |
| $Pt_{60}Ni_{15}P_{25}$ (275C) | 2,100,000 |
| Tar | 30,000,000 |
| E-Glass (800C) | 100,000,000 |
| Glass at $T_g$ | 1,000,000,000,000 |

Based on the preceding equations and calculations, for some exemplary embodiments of the inventive method, a fall time of less than one second will be desirable, such as, for example, when forming and printing hollow spheres of E-glass. This means that, even neglecting drag, the maximum required distance the hollow sphere would need to fall is about 32 feet in some embodiments. For forming and printing in other embodiments, the nozzle (opening) could be moved relative to a stationary platform (or base plate), or the platform could be move in x, y, and z directions to allow for placement of hollow bodies spatially across the plate. The speed of nozzle movement for some embodiments can be calculated using equations and experimental data found, for example, in Kendall (see, Sensational spherical shells Aerospace America January, 1986 and Kendall Physics of Fluids 1986, incorporated herein by reference) where hollow sphere production rate, and diameter are given. In embodiments, the nozzle or plate needs to be able to move at a velocity greater than or equal to the product of the hollow sphere diameter and the hollow sphere production rate for that diameter.

Figure 6:
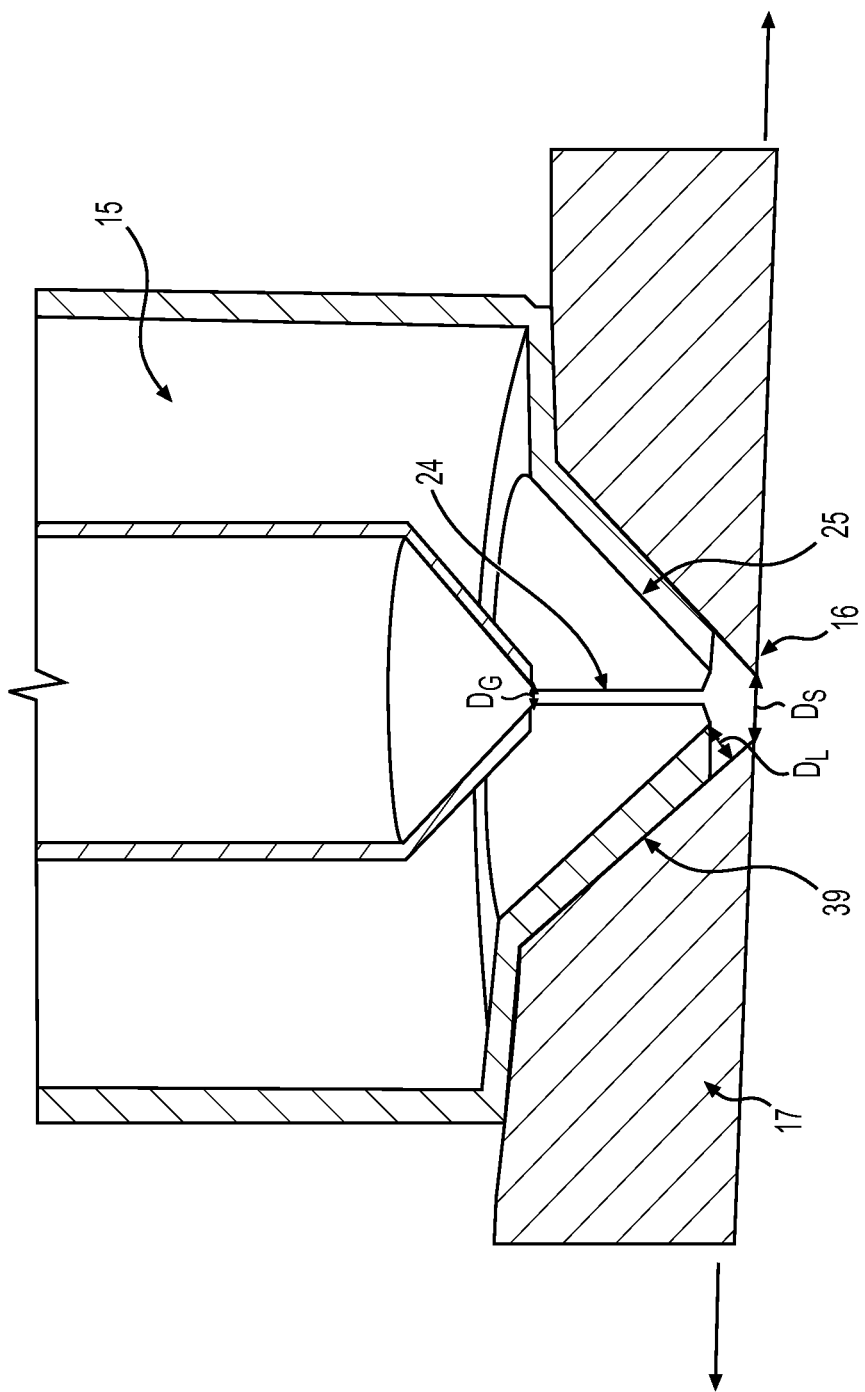
FIG. 6 provides a schematic diagram of an opening area, containing gas and liquid outlets, of an apparatus according to exemplary embodiments of the invention.

FIG. 6 illustrates the opening area, containing the lower gas conduit (15) and amorphous material outlet (16), of an apparatus in accordance with some embodiments of the inventive method. In this configuration, the gas outlet (24) has a diameter of DG, and the liquid amorphous material flows through the amorphous material conduit (39), which has a fluid conduit spacing of $D_L$, formed by the walls (25) of the lower gas conduit (15) and the nozzle plate (17) in the apparatus (10), exiting via the amorphous material outlet (16), which has a diameter of $D_s$. It has been shown that the hollow sphere diameter for most embodiments is approximately equal to twice $D_s$. Thus, in various embodiments, the diameter of the hollow spheres produced by the apparatus may be controlled by expanding or contracting the diameter of the amorphous material outlet (16), for example by moving the walls of the nozzle plate (17) inward and outward, as indicated by the arrows in FIG. 6.

Accordingly, the hollow sphere's radius, r, wall thickness τ, amorphous material flow rate $v_L$, gas flow rate $v_G$, sphere production rate Ḃ, gas outlet (24) radius $r_G$, amorphous material outlet (16) radius $r_L$, volume of gas $V_G$, and volume of liquid $V_L$ are all interrelated. Using this knowledge, it is possible to obtain the following equations:

$$\pi r_G^2 v_G = \frac{\text{volume gas}}{\text{time}} = \frac{V_G}{t} \quad \text{(EQ. 26)}$$

$$(\pi r_L^2 - \pi r_G^2) v_L = \frac{\text{volume liquid}}{\text{time}} = \frac{V_L}{t} \quad \text{(EQ. 27)}$$

$$\dot{B} = \frac{\#\text{spheres}}{\text{time}} \quad \text{(EQ. 28)}$$

$$\frac{4}{3}\pi r^3 = \frac{V_G}{\text{sphere}} \quad \text{(EQ. 29)}$$

$$4\pi r^2 \tau = \frac{V_L}{\text{sphere}} \quad \text{(EQ. 30)}$$

$$\frac{4}{3}\pi r^3 \dot{B} = \pi r_G^2 v_G \quad \text{(EQ. 31)}$$

$$4\pi r^2 \tau \dot{B} = (\pi r_L^2 - \pi r_G^2) v_L. \quad \text{(EQ. 32)}$$

For embodiments of the method each of the required parameters can be obtained using known techniques. For example, a stroboscope can be used to obtain $\dot{B}$, machining gives $r_G$ and $r_L$, a graduated cylinder and stopwatch can give $$\frac{V_L}{t}$$

for low melt temperature liquids, and a camera and ruler or calipers can show r. Further, for such embodiments, $v_L$ and $v_G$ can be calculated, $\tau$ can be calculated or measured from solidified hollow sphere mass, density, and radius, and $\gamma$ may also be obtained (e.g., using Hagen Poiseuille equation and channel length and pressure to calculate liquid flow rate through channel).

Figure 7:
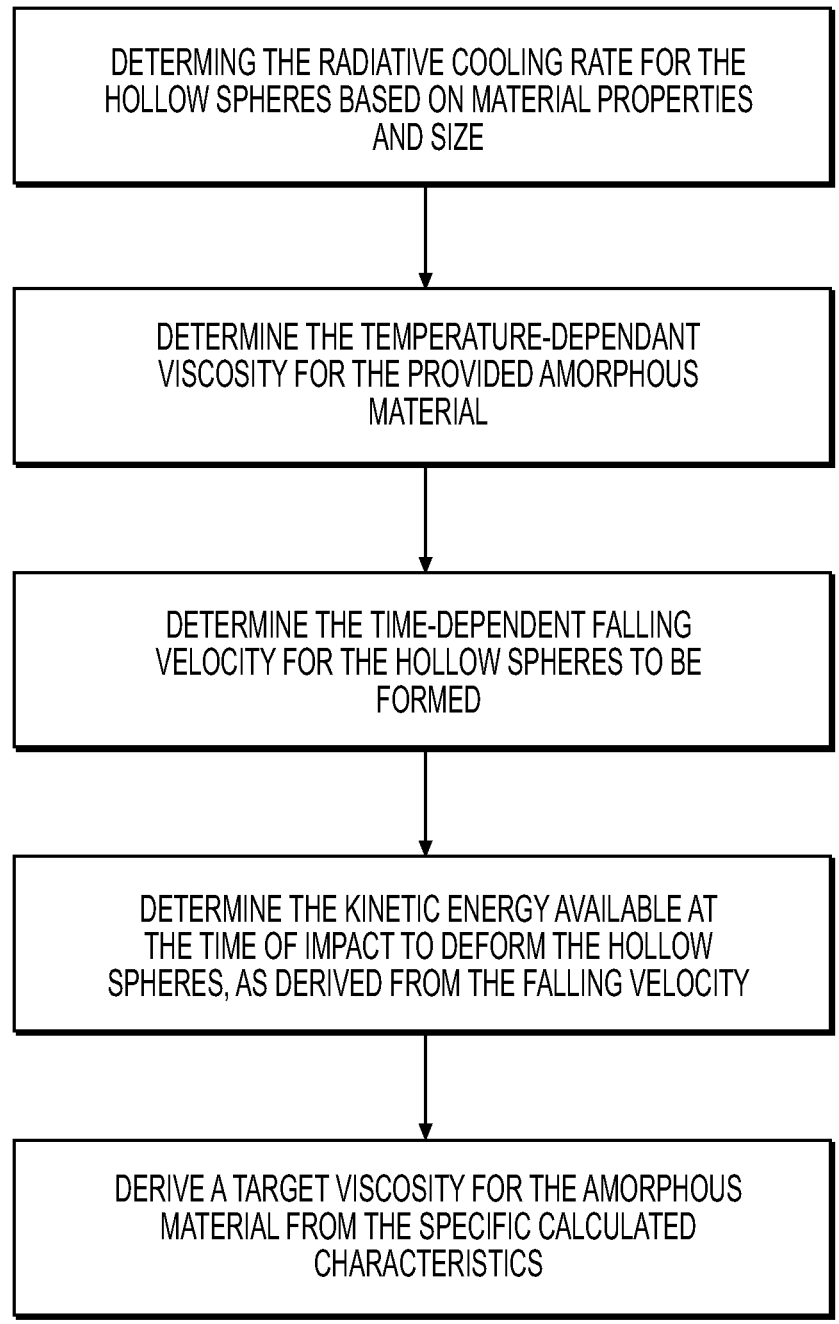
FIG. 7 provides a flow chart showing methods for forming hollow spheres in accordance with embodiments of the invention.

Using the aforementioned calculations and equations in accordance with embodiments of the inventive method, it becomes possible to control the amount of deformation that occurs when the formed and printed hollow spheres impact the base plate. As shown in FIG. 7, for some exemplary embodiments, this process for controlling the deformation of formed and printed spheres comprise the following steps:

Determining the radiative cooling rate for the hollow spheres based on material and size.

Determining the temperature-dependent viscosity for the provided amorphous material.

Determining the time-dependent falling velocity for the hollow spheres.

Determining the kinetic energy available at the time of impact to deform the hollow spheres, where the kinetic energy is derived from the falling velocity.

Deriving a target viscosity range for the amorphous material derived from the specific calculated characteristics.

For embodiments of the method, if hollow spheres have a viscosity (at time of impact) that falls within the target viscosity range, the hollow spheres will deform the desired amount according to the calculations. For some exemplary embodiments of the inventive method, the target viscosity range is obtained to be from 2 Pa-s to 10^8 Pa-s. In other exemplary embodiments, the hollow spheres fall for one second or less. In yet other embodiments, the inventive method further comprises adjusting the base plate (37) or the hollow sphere outlet (12) of the apparatus (10) such that the hollow spheres reach terminal velocity while falling.

With the aforementioned calculations in accordance with exemplary embodiments of the inventive method, a user may ensure that the 3D printed hollow spheres have a viscosity within the target viscosity range at the time of impact by either adjusting the fall time or heating the liquid material reservoir in the apparatus (10) referring to the specific characteristics. The user in such embodiments may then use the apparatus (10) to form a plurality of hollow spheres and allow the hollow spheres to solidify.

It should be understood that the above steps are provided as exemplary; other steps or the order of the steps may be altered (as will be understood) without departing from the scope of the disclosure. The person skilled in the art will recognize that additional embodiments according to the invention are contemplated as being within the scope of the foregoing generic disclosure, and no disclaimer is in any way intended by the foregoing, non-limiting examples.

Figure 8A:
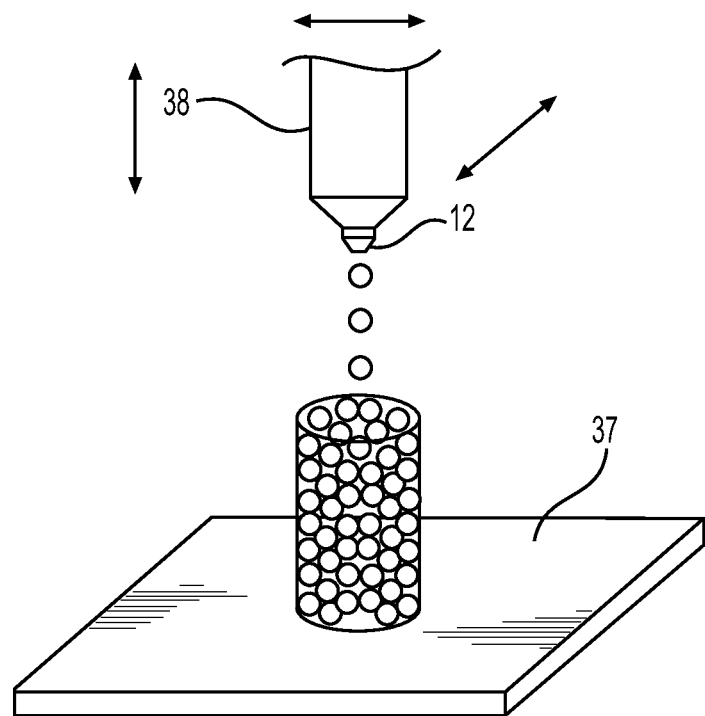
FIGS. 8A and 8B provide schematics of apparatus for printing hollow spheres into structures in accordance with embodiments of the invention.
Figure 8B:
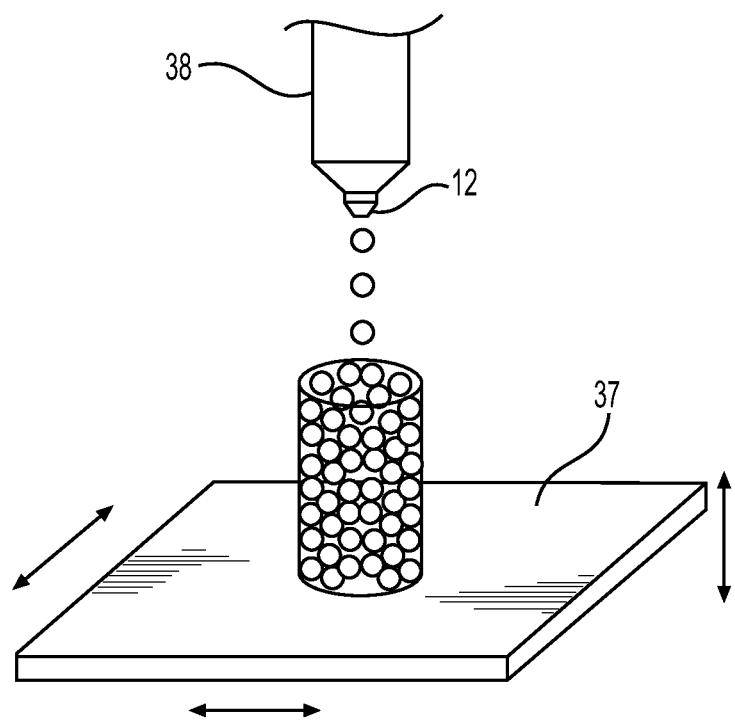

Embodiments Using Semispherical Hollow Bodies for Additive Manufacturing Processes Although the above discussion has focused on embodiments of apparatus and methods for forming single hollow spheres of amorphous materials, embodiments are also directed to methods of using such apparatus to print a plurality of such hollow spheres in an additive layer-by-layer manner to form an object. Schematic diagrams of exemplary apparatus in accordance with such embodiments are shown in FIGS. 8A and 8B. For example, in some embodiments, a hollow sphere forming apparatus (10) may be disposed in moving relation relative to a base plate (37). In some such embodiments, as shown in FIG. 8A, the forming apparatus may be movable relative to the base plate, or, as shown in FIG. 8B, the base plate may be movable relative to the forming apparatus. Although relative movement within only a single plane is shown, it will be understood that to build up three-dimensional objects the relative movement must include movement in a vertical, z-direction. Using such a system, it is possible to dispose hollow spheres in any configuration, and build a three-dimensional object in an additive layer-by-layer fashion, as shown in the figures.

Figure 9:
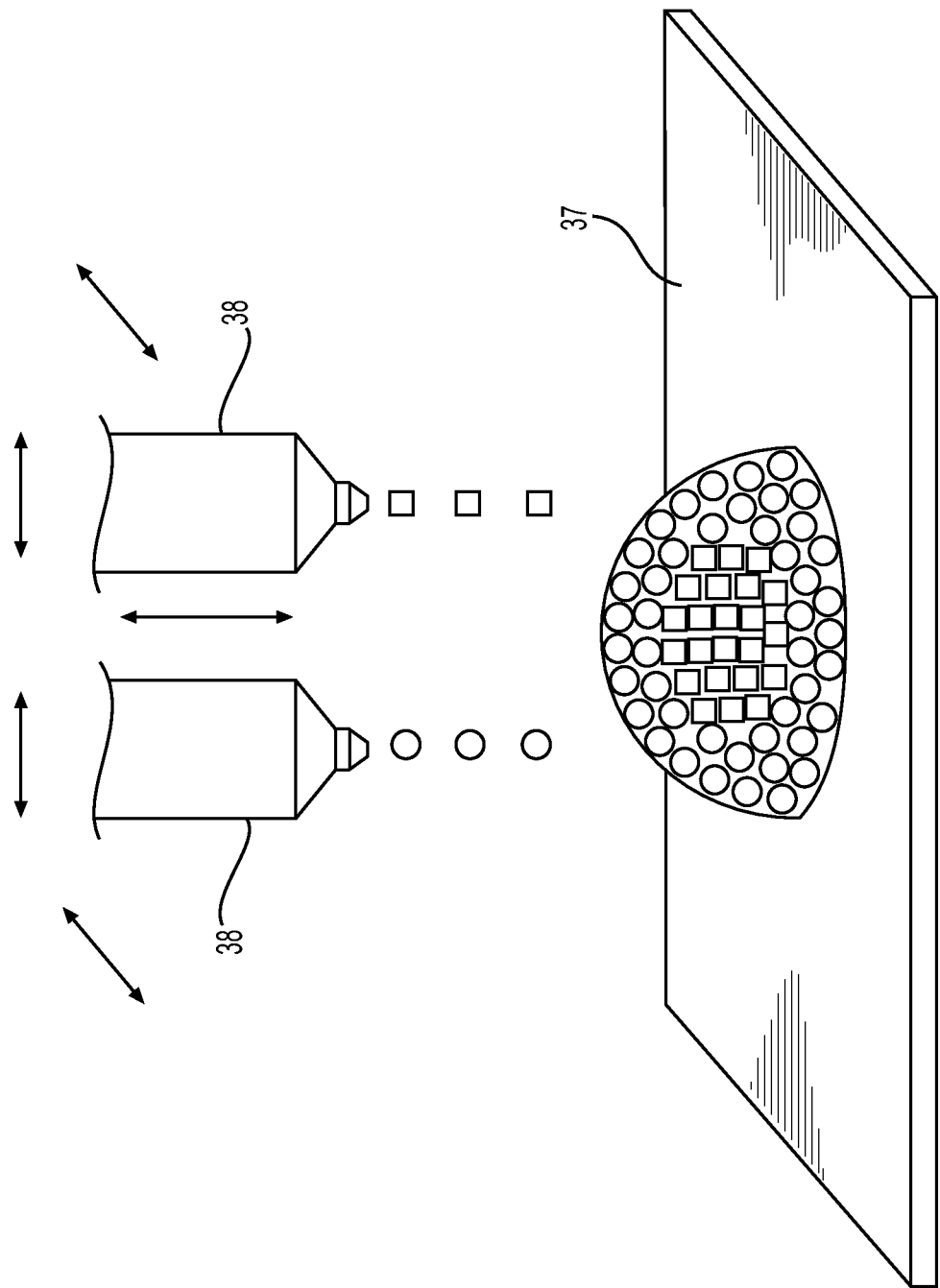
FIG. 9 provide schematics of apparatus for printing hollow spheres into structures in accordance with embodiments of the invention.

Although FIGS. 8A and 8B show objects formed using a single nozzle, and using only hollow spheres, it will be understood that multiple nozzles may be used such that multiple materials may be deposited together. For example, as shown in FIG. 9, in some embodiments multiple forming nozzles (38) may be used to deposit onto base plates (37) hollow spheres formed with different physical parameters (e.g., size, shape, wall thickness, etc.), or, alternatively, hollow spheres of different materials, or even hollow spheres in conjunction with non-hollow sphere materials (e.g., support materials, etc.). For example, if multiple nozzles are used, one nozzle could be turned off and another nozzle opened to deposit a different material. That material could be a "filler" or sacrificial material for creating more complex geometries as is commonly done in 3D printing. Using such methods and apparatus, metallic glass bubbles could be used to form very complex objects. For example, such methods and apparatus could provide electrical conductive pathways inside silicate glass bubble foam materials. Alternatively, hollow sphere regions could be included inside 3D printed wings or doors or sandwich structures. Such multiple 3D printing methods could use, for example, plastic FDM, metal SLS, UV cured resin etc. followed by layers of 3D printed foam.

It will be understood that any suitable additive manufacturing process or control method may be combined with the current embodiments. Exemplary additive manufacturing techniques that may be combined include, binder jetting, directed energy deposition, material extrusion, material jetting, powder bed fusion, sheet lamination, and vat photopolymerization. Exemplary fused filament fabrication or fused deposition modeling (FDM) techniques may use a feedstock of material which is fed into an extrusion nozzle head (3D printer extruder), which heats the material during deposition may be used. Alternatively, laser sintering techniques include selective laser sintering, which fuse powder granules using a high-energy laser to create fully dense materials in a layer-wise method may be used. Another technique would be stereolithography to produce a solid part from a liquid may be utilized. Inkjet printer systems that spray materials onto a build tray in ultra-thin layers may also be used.

Although specific methods and techniques are described, it should be understood that the above techniques are provided as exemplary; other techniques may be used without departing from the scope of the disclosure. The person skilled in the art will recognize that additional embodiments according to the invention are contemplated as being within the scope of the foregoing generic disclosure, and no disclaimer is in any way intended by the foregoing, non-limiting examples.

DOCTRINE OF EQUIVALENTS

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

What is claimed is:

1. An apparatus for forming hollow spheres from an amorphous material comprising:
    a heatable amorphous material reservoir having upper and lower ends and defining an inner volume, and wherein the lower end has an amorphous material outlet formed therein;
    at least one gas conduit in fluid communication with a gas supply and having a gas outlet disposed at one end thereof, the gas outlet being disposed substantially coaxially within the amorphous material outlet;
    at least one amorphous material conduit defined by a gap between an inner wall of the amorphous material outlet and an outer wall of the gas outlet, and being in fluid communication with an inner volume of the heatable amorphous material reservoir;
    wherein at least a portion of the at least one gas conduit is vertically movable within the apparatus and configured such that a vertical movement of the at least one gas conduit alters a volume of a flow of a fluid amorphous material through the at least one amorphous material conduit from a closed state wherein a portion of the at least one gas conduit seals against a portion of the at least one amorphous material conduit to prevent the fluid amorphous material from flowing through the amorphous material outlet, to an open state wherein the fluid amorphous material disposed within the heatable amorphous material reservoir flows through the at least one amorphous material conduit to the amorphous material outlet; and
    wherein the gas and amorphous material outlets are configured such that gas flowing through the gas outlet is entrained within the flow of the fluid amorphous material as one or more hollow spheres at the amorphous material outlet;
    wherein a diameter of the amorphous material outlet is variable such that a diameter of the one or more hollow spheres is variable.

2. The apparatus of claim 1, wherein the vertical movement of the at least one gas conduit causes a concomitant movement in a vertical position of the gas outlet relative to the amorphous material outlet, such that a width of the gap forming the at least one amorphous material conduit, and thereby the volume of a flow of the fluid amorphous material is adjustable from a closed state wherein the outer wall of the gas outlet presses against the inner wall of the amorphous material outlet, to the open state such that a fluid amorphous material disposed within the heatable amorphous material reservoir flows through the at least one amorphous material conduit to the amorphous material outlet.

3. The apparatus of claim 1, wherein a change in the at least one amorphous material conduit from the open to the closed state is configured to allow for the formation of a single hollow sphere.

4. The apparatus of claim 1, wherein a width of the gap in the open state is variable such that the thickness of walls of the one or more hollow spheres is variable.

5. The apparatus of claim 1, further comprising a separate gas nozzle defining the gas outlet and being adjustably disposed within the end of the at least one gas conduit.

6. The apparatus of claim 1, wherein a relative vertical position of the gas outlet within the amorphous material outlet is adjustable by rotating the at least one gas conduit within the apparatus.

7. The apparatus of claim 1, wherein an amorphous material disposed within an inner volume is selected from the group consisting of glass compositions, silicate glasses, metallic glasses, ceramic glasses, and composite materials with an amorphous phase and amorphous or crystalline inclusions.

8. The apparatus of claim 1, wherein the amorphous material outlet is annular.

9. The apparatus of claim 1, further comprising a base plate disposed in line with the amorphous material and gas outlets.

10. The apparatus of claim 9, wherein a distance between the base plate and the amorphous material and gas outlets is such that the hollow sphere formed at the amorphous material outlet reaches terminal velocity while falling.

11. The apparatus of claim 9, wherein one or both the lower end of the heatable amorphous material reservoir and the base plate are moveable relative to each other in at least three dimensions.

12. The apparatus of claim 9, further comprising a cooling element disposed between the amorphous material outlet and the base plate.

13. The apparatus of claim 9, wherein a viscosity of the one or more hollow spheres at the base plate is from 2 Pa-s to $10^8$ Pa-s.

14. The apparatus of claim 9, wherein the amorphous material outlet and the base plate are moveable relative to each other at a velocity greater than or equal to a product of a diameter of the one or more hollow spheres and a hollow sphere production rate for the apparatus at that diameter.

15. The apparatus of claim 9, further comprising at least one additive manufacturing apparatus disposed above the base plate.

16. The apparatus of claim 15, wherein the at least one additive manufacturing apparatus is configured to deposit a support material.

17. The apparatus of claim 1, further comprising a crucible disposed in heating relation with the heatable amorphous material reservoir.

18. The apparatus of claim 1, wherein the one or more hollow spheres have a radius of from 10 um to 10 mm.

19. The apparatus of claim 1, wherein the one or more hollow spheres have a wall thickness from a fourth to a hundredth of the radius of the one or more hollow spheres.

20. An apparatus for forming hollow spheres from an amorphous material comprising:
- a heatable amorphous material reservoir having upper and lower ends and defining an inner volume, and wherein the lower end has an amorphous material outlet formed therein;
- at least one gas conduit in fluid communication with a gas supply and having a gas outlet disposed at one end thereof, the gas outlet being disposed substantially coaxially within the amorphous material outlet;
- at least one amorphous material conduit defined by a gap between an inner wall of the amorphous material outlet and an outer wall of the gas outlet, and being in fluid communication with an inner volume of the heatable amorphous material reservoir;
- wherein at least a portion of the at least one gas conduit is vertically movable within the apparatus and configured such that a vertical movement of the at least one gas conduit alters a volume of a flow of a fluid amorphous material through the at least one amorphous material conduit from a closed state wherein a portion of the at least one gas conduit seals against a portion of the at least one amorphous material conduit to prevent the fluid amorphous material from flowing through the amorphous material outlet, to an open state wherein the fluid amorphous material disposed within the heatable amorphous material reservoir flows through the at least one amorphous material conduit to the amorphous material outlet;
- wherein the gas and amorphous material outlets are configured such that gas flowing through the gas outlet is entrained within the flow of the fluid amorphous material as one or more hollow spheres at the amorphous material outlet;
- wherein the vertical movement of the at least one gas conduit causes a concomitant movement in a vertical position of the gas outlet relative to the amorphous material outlet, such that a width of the gap forming the at least one amorphous material conduit, and thereby the volume of a flow of the fluid amorphous material is adjustable from a closed state wherein the outer wall of the gas outlet presses against the inner wall of the amorphous material outlet, to an open state such that a fluid amorphous material disposed within the heatable amorphous material reservoir flows through the at least one amorphous material conduit to the amorphous material outlet;
- wherein a change in the at least one amorphous material conduit from the open to the closed state is configured to allow for the formation of a single hollow sphere of the one or more hollow spheres;
- wherein a width of the gap in the open state is variable such that the thickness of walls of the one or more hollow spheres is variable;
- wherein a diameter of the amorphous material outlet is variable such that a diameter of the one or more hollow spheres is variable;
- wherein a relative vertical position of the gas outlet within the amorphous material outlet is adjustable by rotating the at least one gas conduit within the apparatus;
- wherein an amorphous material disposed within an inner volume is selected from the group consisting of glass compositions, silicate glasses, metallic glasses, ceramic glasses, and composite materials with an amorphous phase and amorphous or crystalline inclusions;
- wherein the amorphous material outlet is annular;
- further comprising a base plate disposed in line with the amorphous material and gas outlets;
- wherein a distance between the base plate and the amorphous material and gas outlets is such that the one or more hollow spheres formed at the amorphous material outlet reaches terminal velocity while falling;
- wherein one or both the lower end of the heatable amorphous material material reservoir and the base plate are moveable relative to each other in at least three dimensions;
- further comprising a cooling element disposed between the amorphous material outlet and the base plate;
- wherein a viscosity of the one or more hollow spheres at the base plate is from 2 Pa-s to $10^8$ Pa-s;
- wherein the amorphous material outlet and the base plate are moveable relative to each other at a velocity greater than or equal to a product of a diameter of the one or more hollow sphere and a hollow sphere production rate for the apparatus at that diameter;
- further comprising at least one additive manufacturing apparatus disposed above the base plate; and
- wherein the at least one additive manufacturing apparatus is configured to deposit a support material.

* * * * *